Aug. 5, 1941.  R. PAYSON  2,251,466
POWER TRANSMISSION DEVICE
Filed May 1, 1939  2 Sheets-Sheet 1
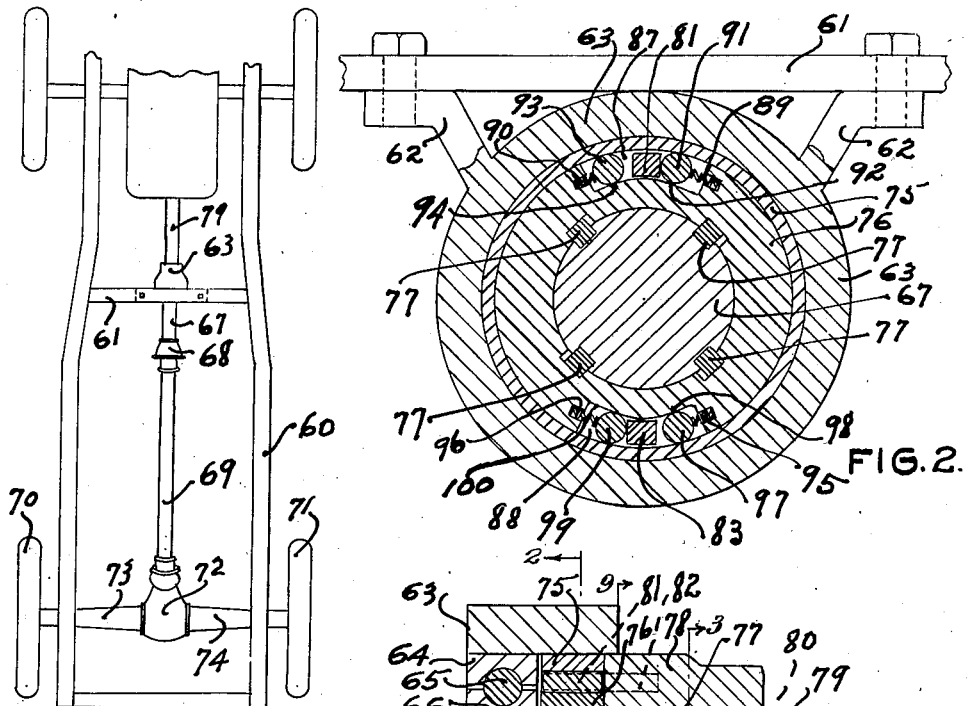
FIG. 10.
FIG. 2.
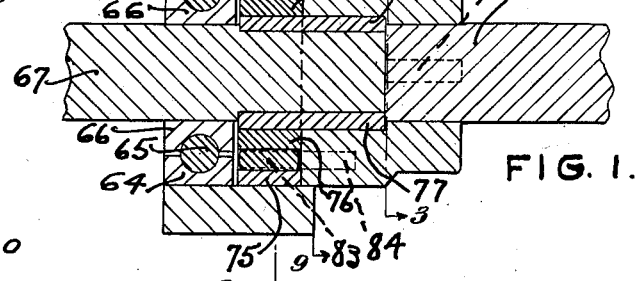
FIG. 1.
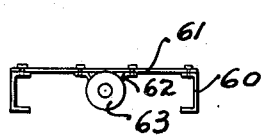
FIG. 11.
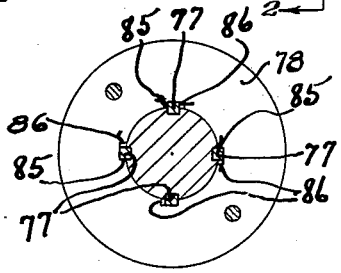
FIG. 9.
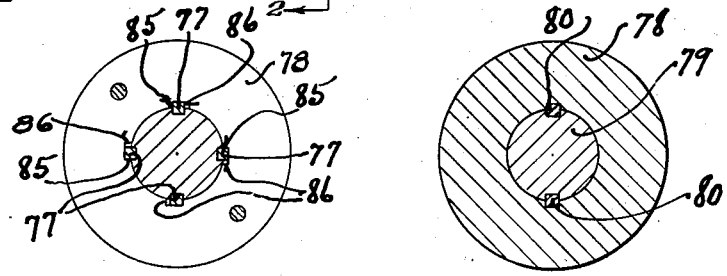
FIG. 3.
INVENTOR
Rudolph Payson

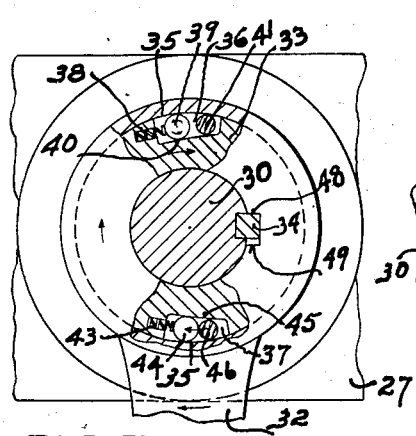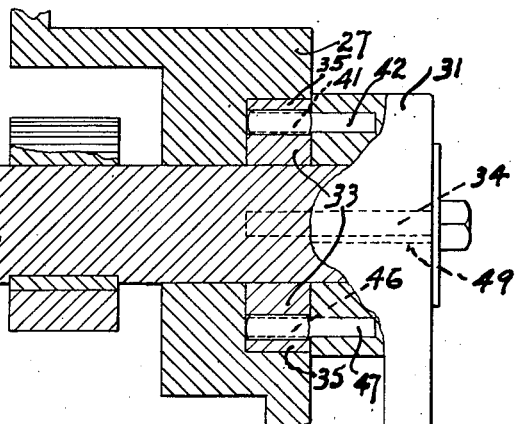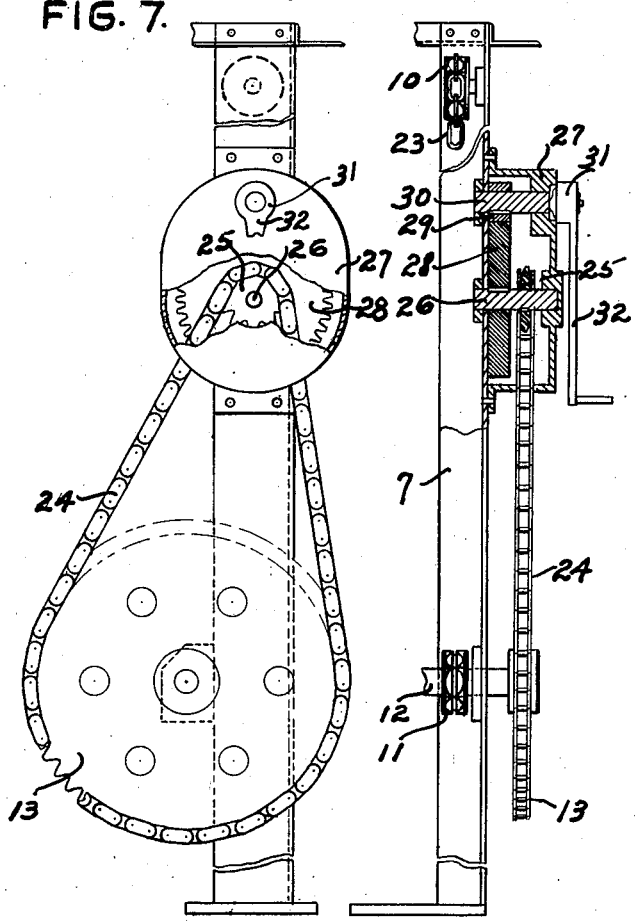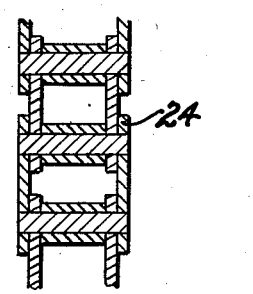

Patented Aug. 5, 1941

2,251,466

UNITED STATES PATENT OFFICE 2,251,466

POWER TRANSMISSION DEVICE

Rudolph Payson, Flushing, N. Y.

Application May 1, 1939, Serial No. 271,110

19 Claims. (Cl. 192—8)

This invention relates to power transmission systems and more particularly to transmission systems as applied to winches, hoists, motor vehicles and the like of machines wherein the transmission system is subject to reversible operation.

An object of this invention is to provide in a transmission system of the character described a system of control.

Another object of this invention is to provide a mechanism wherein silent operation of holding means is attained, specifically through the use of a roll and an incline.

Another object of this invention is to provide a holding mechanism adapted to prevent operation of the receiving side of the transmission system unless the delivery side thereof is operative.

Another object of the invention is to provide an automatic control of a holding mechanism in a reversible power transmission system.

Another object of the invention is to provide a mechanism operated by the input side of a transmission system to automatically release holding mechanism on the receiving side of a reversible power transmission system.

Another object of this invention is to provide an automatic lock against retrograde movement of an automotive vehicle operative when going uphill and power application to the vehicle ceases.

Another object of this invention is to provide an automatic lock operative against downhill movement of an automotive vehicle headed down hill when power application to the vehicle ceases.

Another object of this invention is to provide an automatic lock operative against movement forward or backward of an automotive vehicle when power application to the vehicle ceases.

Another object of this invention is to provide an automatic release with the application of power to an automotive vehicle provided with an automatic lock operative against movement forward or backward on said vehicle when power application to said vehicle ceases.

Other objects will be revealed by the drawings and description.

Referring to the drawings—

Fig. 1 is a longitudinal partial sectional view in elevation of Fig. 10.

Fig. 2 is an enlarged partial sectional view of the coupling and mounting along line 2—2 of Fig. 1.

Fig. 3 is a cross sectional view along line 3—3 of Fig. 1.

Fig. 4 is a side elevation, and Fig. 5 is a partial sectional front elevation of the transmission and power portion of an elevator system.

Fig. 6 is a partial sectional view in elevation with detail of the power drive shown in Fig. 5.

Fig. 7 is a partial cross sectional view of the power drive mechanism shown in Fig. 6.

Fig. 8 is a sectional view of the roller chain used in the drive mechanism of Fig. 5.

Fig. 9 is a cross sectional view along 9—9 of Fig. 1.

Fig. 10 is a plan view of the embodiment of the invention as applied to a motor vehicle.

Fig. 11 is a cross sectional view of the motor vehicle chassis of Fig. 10 showing the mounting of this embodiment of the invention.

Referring to Fig. 5, we have an upright structural member 7 which carries top sheave 10 and bottom sheave 11. Bottom sheave 11 rotates with shaft 12 which also carries large chain sprocket 13 thereon. Straight link chain 23 is fastened to the underside of platform 19 not shown and passes down and around sheave 11 upwardly and over sheave 10 and down to platform 19 where it is fastened again. The engagement of the chain 23 with sheave 11 is positive, so that as sheaves are rotated by shaft 12 and gear 13 the chain 23 positions the platform along the upright member 7.

The gear 13 is connected by roller chain 24 to a sprocket gear 25 keyed on shaft 26 in a housing 27. Mounted in housing 27 is a spur gear 28 keyed to shaft 26 and engaging spur pinion gear 29 which is keyed to shaft 30 and also mounted in housing 27 to project therefrom and carry crank hub 31 and crank 32. A crank wheel 32' is shown in Figs. 1 to 3 inclusive.

Particular interest resides in the connection between the crank hub 31 and shaft 30 which is shown in detail in Figures 6 and 7. The hub 31 abuts against the housing 27 and a ring 33 set into the housing, the ring 33 and hub 31 being held by key 34 to rotate with shaft 30. Around the ring 33 is a ring 35 held in fixed position relative to housing 27 by means not shown. Circumferential pockets 36 and 37 in ring 33 are provided. The end wall of pocket 36 is recessed to support in position spring 38 which bears against roll 39 that rides on surface 40. Spring 38 normally maintains roll 39 in engagement with surface 40 and ring 35 so that any tendency of ring 33 to travel to the left toward spring 38 is checked by a wedge action between roll 39 and rings 33 and 35. A member 41 in pocket 36 to the right of roll 39 (Fig. 7) has an anchor extension 42 set into hub 31. The end wall of pocket 37 is recessed to support in position spring 43 bearing against roll 44 that rides on surface 45. Spring 43 normally maintains roll 44 in engagement with surface 45 and ring 35 so that any tendency of ring 33 to travel to the left toward spring 43 is checked by a wedge action between roll 44 and rings 33 and 35. A member 46 in pocket 37 to the right of roll 44 (Fig. 7) has an anchor extension 47 set into hub 31. The members 41 and 46 are so disposed relative to the rolls 39 and 44 and on hub 31 that contact between only one member and its adjacent roll can occur at any given time, and change of contact is effected by movement of hub 31 relative to ring 33. While ring 33 is tightly keyed to shaft 30, hub 31 is loosely keyed to shaft 30, so that key 34 (Figs. 6 and 7) makes contact with hub 31 on surfaces 48 and 49 which are separated sufficiently to give the desired free swing to hub 31. The free swing of hub 31 is of a degree required by extensions 41 and 46 of said hub to operate properly upon locking rolls 39 and 44 respectively.

Referring to the embodiment of the invention disclosed in Figures 1, 2, 3, 9, 10, 11 as applied to an automobile, we have an auto chassis 60 with mid-section cross brace 61 on which is a bracket 62 supporting a casing 63. In the casing 63 is mounted outer ball race 64 supporting balls 65 and inner race 66 and stub shaft 67 extending to the rear. The stub shaft 67 through universal joint 68 drives shaft 69 which drives wheels 70 and 71 through differential 72 and axles 73 and 74 in the manner usual to the art. Within the housing 63 is tightly set a ring 75 adjacent to and forward of bearing race 64. The degree of tightness of the ring 75 within the housing 63 is of such a value as to just hold said ring against rotation when a light turning moment is on the ring, such as would be applied when the brakes not shown are applied to the wheels 70 and 71, and the car comes to a stop and rests on a slight incline or on the level while torque on the drive shaft 79 is cut off. Should a heavy turning force be applied to the ring 75, as would occur when the car would coast down hill without power, it is contemplated that the engagement between the ring 75 and the connection to the frame should take on a degree of relative movement until the turning force is reduced by the usual wheel brakes and by the fit within the housing 63. Within ring 75 is ring 76 loosely held by key 77 to the stub shaft 67. Abutting the housing 63 and rings 75 and 76 is a collar 78 loosely keyed by keys 77 to shaft 67 and tightly keyed to shaft 79 by key 80. Shaft 79 is connected to the usual automotive power source through clutches transmissions and couplings in accord with automotive operating practice. The portion of collar 78 abutting rings 75 and 76 carries pin 81 with anchor portion 82 and pin 83 with anchor portion 84. The keys 77 are tightly seated in shaft 67 and fit into circumferentially enlarged keyways in collar 78 to swing between surfaces 85 and 86. In Figure 2, surfaces 85 and 86 are shown with keys 77 to express the swing action of keys 77 in coupling 78. Circumferential pockets 87 and 88 in inner ring 76 are provided. The right end wall (Fig. 2) of pocket 87 is recessed to support spring 89, and the left end wall to support spring 90. Spring 89 bears against roller 91 riding on surface 92. Spring 90 bears against roller 93 riding on surface 94. Surfaces 92 and 94 form the bottom of pocket 87 into which extends pin 81 between rolls 91 and 93. The relationship between ring 75, surfaces 92 and 94 and rolls 91 and 93 is such that springs 90 and 89 maintain said rolls wedged between said ring and surfaces unless one of said rolls is held out of locking action by pin 81. The right end wall of pocket 88 is recessed to support spring 95, and the left end wall to support spring 96. Spring 95 bears against roller 97 bearing on surface 98. Spring 96 bears against roller 99 bearing against surface 100. Surfaces 98 and 100 form the boundary of pocket 88 into which extends pin 83 between rolls 97 and 99. The relationship between ring 75, surfaces 98 and 100 is such that springs 95 and 96 maintain said rolls wedged between said ring and surfaces unless held out of locking action by pin 83. The automatic locking action of rolls 91 and 93 is devised to prevent rotation of shaft 67 in either direction and to be released by moving both rolls in the direction in which rotation of shaft 67 is desired. The automatic locking action of rolls 97 and 99 is devised to prevent rotation of shaft 67 in either direction and to be released by moving both rolls in the direction in which rotation of shaft 67 is desired. Since rolls 91 and 93 effectively lock against rotation and rolls 97 and 99 do the same independently, a coordinated releasing action between the said two pairs of rolls is provided by the arrangement of pins 81 and 83. Referring to Fig. 2, it is provided that when pin 81 moves to the right to contact roll 91, pin 83 moves to the left to contact roll 99, the said pins on collar 78 being actuated by shaft 79. It is also provided that when pin 81 moves to the left to contact roll 93, pin 83 moves to the right to contact roll 97. The degree of movement of pins 81 and 83 relative to collar 76 is determined by the widths of keyways for keys 77 between faces 85 and 86. This width is such as to permit pins 81 and 83 to completely release the rolls in the direction in which rotation of shaft 67 is desired before the keys 77 contact either face 85 or 86, the rolls following the pins automatically releasing themselves due to their rolling action on their inclined supporting surfaces. The inclination of the supporting surfaces 92, 94, 98 and 100 is such as to pinch one of the rolls of a co-operating pair against ring 75 when said rolls are out of contact with pins 81 and 83 and said surfaces tend to move. It is thus seen that the receiving end of the transmission system is automatically doubly locked against rotation when the respective pins are out of contact with their associated rolls and automatically released when power is applied to the drive shaft 79. It is to be further noted that the transmission system is subjected to a wedging action by locking members so arranged as to provide an infinite number of points at which locking may take place, which is in marked contrast to those devices having limited locking points provided by notches with ratchets and levers working therein previously provided in the art.

Assume a car with this invention installed is at rest upon a supporting surface and with input power shaft 79 stationary and keys 77 in contact with either surface 85 or 86. Then pins 81 and 83 are operative to hold one roll of each pair of rolls from locking action. Now assume that the car starts to move in either direction causing shaft 67 to rotate. Then ring 76 causes the rolls to move away from contact with pins 81 and 83 as keys 77 move away from contact with surface 85 or 86. As the rolls move away from contact with pins 81 and 83 they are wedged against ring 75 thereby locking the shaft 67 from rotation and thus holding the car from further movement. Application of power to shaft 79 in either direction of rotation causes pins 81 and 83 to contact the pair of rolls that hold or tend to hold the shaft 67 from rotation in the direction of shaft 79 and releases them so that the shaft 67 is free to rotate.

While the locking device has been shown where the power is supplied to the elevator, it may also be applied at various locations along the power system. Thus it may be applied to the drive shaft 12 where it will hold the shaft and platform in case the roller drive chain should fail. By applying the locking device at the initial source of power application the holding force required by the mechanism is at its minimum and therefore the size of the device is at its minimum.

The invention is also adapted for application to the elevator illustrated wherein no counterweight has been utilized. Such an application involves the use of one direction locking rolls which act to prevent the lowering of the elevator platform when force on the operating handle is absent.

The several embodiments of the invention as illustrated in various applications are only representative of the diversity of use of the invention, and the scope of the invention is to be interpreted only as within the terms of the appended claims.

I claim:

1. In a power transmission system the combination comprising a frame, a driven shaft mounted for reversible rotation in said frame, wedging means to lock said driven shaft against clockwise rotation, wedging means to lock said driven shaft against counter-clockwise rotation, adjacent said locking means a driving sleeve coupling to said driven shaft, and means associated with said coupling adapted to selectively release one of said adjacent locking means thereby permitting said coupling to rotate said last mentioned shaft.

2. In a power transmission system, the combination comprising a frame, a driven shaft mounted for reversible rotation in said frame, wedging means to lock said driven shaft against clockwise rotation, wedging means to lock said driven shaft against counter-clockwise rotation, a sleeve coupling driving connection to said driven shaft adjacent said locking means and between said locking means means adapted to swing from one to the other locking means with said connection and transmit sufficient pressure from said sleeve coupling connection to one of said locking means to release said one means thereby permitting said connection to rotate said shaft.

3. In a power transmission system, the combination comprising a frame, a driven shaft mounted for reversible rotation in said frame, wedging means to lock said driven shaft against clockwise rotation, wedging means to lock said driven shaft against counter-clockwise rotation, a sleeve driving coupling to said driven shaft adjacent said locking means and between said means means adapted to swing from one to the other locking means and effect release of the wedging lock with which contact is being made, the direction of swing effecting a release being controlled by the sleeve coupling to drive said driven shaft.

4. In a power transmission system, the combination comprising a frame, a driven shaft mounted for reversible rotation in said frame, wedging means to lock said driven shaft against clockwise rotation, wedging means to lock said driven shaft against counter-clockwise rotation, a driving sleeve connection to said driven shaft adjacent said locking means and between said means means adapted to travel from one to the other locking means and effect release of the one lock with which contact is being made, the driving side of the sleeve connection having a freedom of swing sufficient to effect said release before establishing driving connection with said driven shaft.

5. In a power transmission device the combination of a driving shaft and a driven shaft mounted in end to end relation with a sleeve coupling therebetween adapted to control a wedging lock mounted on the driven side of said coupling when the driven side is not operative, whereby rotative force on the driven side is withheld from the driving member when the latter is not delivering power.

6. In a power transmission system, the combination comprising a frame, a driven shaft mounted in said frame, wedging means to hold said shaft from rotating, sleeve coupling means to drive said shaft, and means at the end of said driving means controlled by said driving means to release said wedging locking means as said driving means rotates thereby making said sleeve coupling driving means effective upon said shaft.

7. In a power transmission system, the combination comprising a frame, a driven shaft mounted in said frame, wedging means to hold said shaft from rotating, adjacent said holding means, sleeve coupling means to drive said shaft, and means joining said driving means and said shaft adapted to release said wedging locking means as said driving means rotates thereby making said sleeve coupling driving means effective upon said shaft.

8. In a power transmission system the combination comprising a frame, a shaft mounted for reversible rotation in said frame, wedging means to lock said shaft from rotation, a second shaft concentric with said first shaft and releasably connected to a power source, a sleeve coupling adjacent said wedging locking means and between said shafts, and means connected to said sleeve coupling operative to release said wedging lock when said second shaft is operated by said power source.

9. In a power transmission system the combination comprising a frame, a shaft mounted for reversible rotation in said frame, wedging means to lock said shaft from rotation, a second shaft concentric with said first shaft and releasably connected to a power source, adjacent said locking means a sleeve coupling between said shafts and means operated by the rotation of said sleeve coupling effective to release said wedging lock when said second shaft is operated by said power source.

10. In a power transmission system, the combination comprising a frame, a pair of shafts mounted concentrically in said frame, a driving sleeve coupling joining said shafts together with a degree of free rotation between said coupling and the driven shaft, outside said coupling wedging means to lock said driven shaft against rotation, and means carried by said coupling controlling said wedging locking means adapted to utilize said degree of free rotation to release said locking means whereby said pair of shafts and said coupling are permitted to rotate as a unit.

11. In a power transmission system, the combination comprising a frame, a pair of shafts mounted concentrically in said frame, a driving sleeve coupling joining said shafts together with a degree of free rotation between said coupling and the driven shaft, outside said coupling, wedging means to lock said shaft against rotation in either direction, and means carried by said coupling controlling said locking means adapted to utilize said degree of free rotation to release the locking means for rotation in the direction in which said free rotation occurs.

12. In a power transmission system, the combination comprising a frame, a pair of shafts mounted concentrically in said frame, a driving coupling joining said shafts comprising a collar fastened to one of said shafts to move therewith and loosely fastened to the other of said shafts to accommodate a small degree of rotation of said collar on said last mentioned shaft preliminary to said driving action, at the end of said coupling a first ring fastened on said last mentioned shaft, a second ring fastened to said frame and enclosing said first ring, a recess in said first ring having a radially inclined contour, a roller riding on said inclined contour adapted according to its position to make and break locking contact with said rings, and a member driven by said coupling adapted to utilize said small degree of rotation to break said rollers' locking contact and to hold said roller from locking action as said first shaft drives said second shaft through said coupling and its fastenings to said shafts.

13. In a power transmission system, the combination comprising a frame, a driving shaft and a driven shaft mounted concentrically in said frame, a coupling joining said shafts with a degree of free rotation between said coupling and said driven shaft; a lock between said driven shaft and said frame comprising a ring fastened on said driven shaft adjacent the end of said coupling, said ring fitting within a bore in the frame, a recess in said ring, a roller in said recess with its axis parallel to the driven shaft axis, a rolling surface at the bottom of said recess providing a gradually narrowing passage between said bore and said ring, means to move said roller along said narrowing passage to establish said roller in contact with said ring and bore; and means controlling said lock extending from said coupling into said recess, and said free rotation being utilized to operate said controlling means.

14. In a power transmission system, the combination comprising a frame, a driving shaft and a driven shaft mounted concentrically in said frame, a coupling joining said shafts with a degree of free rotation between said coupling and said driven shaft; a lock between said driven shaft and said frame comprising a ring fastened on said driven shaft adjacent the end of said coupling, said ring fitting within a bore in the frame, a recess in said ring, a pair of rollers in said recess parallel to the axis of said driven shaft, a rolling surface at the bottom of said recess providing a pair of gradually narrowing passages between said bore and said ring narrowing towards each other, means to move each roller in its narrowing passageway to establish contact between said bore and said ring thereby providing a lock against rotation in either direction by said driven shaft, and means controlling said locks extending from said coupling into said recess, and between said rolls, said free rotation being utilized to operate said controlling means.

15. In a power transmission system, the combination comprising a frame, a pair of shafts mounted concentrically in said frame, a driving coupling joining said shafts together with a degree of free rotation between said coupling and the driven shaft, at the end of said coupling independent wedging means to lock said driven shaft against rotation, and means carried by said coupling controlling said locking means adapted to utilize said degree of free rotation to release said locking means whereby said shafts and said coupling are permitted to rotate as a small diameter unit.

16. In power transmission machinery, the combination of a power transmission unit, a lock unit, and an interlocking member between said units in end to end relation; said power transmission unit comprising a driving shaft, a driven shaft, and a direct coupling between said shafts fastened tightly to said driving shaft and fastened loosely to said driven shaft to provide a degree of free rotation on the latter; said locking unit comprising a first ring fastened to said driven shaft within a second restrained ring, a pair of rollers bearing on said second ring while riding on the wedging bottom of a recess in said first ring, and means to urge said rollers to said bearing; said interlocking member being mounted between said rollers to swing with said free rotational movement whereby said lock is controlled by said movement.

17. In power transmission machinery, the combination of a power transmission unit, a lock unit, and an interlocking member between said units, in end to end relation, said power transmission unit comprising a driving shaft, a driven shaft, and a direct coupling between said shafts fastened tightly to said driving shaft and fastened loosely to said driven shaft to provide a degree of free rotation on the latter; said locking means comprising a restrained member, a pair of rolls on a member carried by said driven shaft and adapted to urge said pair of rolls in a locking position against said restrained member; said interlocking member being mounted between said rolls to swing with said free rotation thereby controlling the locking action of said rolls.

18. In power transmission machinery, the combination of a power transmission unit comprising a driving shaft, a driven shaft, and a direct coupling between said shafts, keyed tightly to said driving shaft and keyed loosely to said driven shaft providing said coupling a degree of free rotational movement with a locking unit comprising a first ring fastened to said driven shaft within a stationary second ring against which bear a pair of rollers riding the wedging bottom of a recess in said first ring while springs urge said rollers to said bearing, and cooperatively positioned between said transmission unit and said lock unit a member mounted between said rolls to swing with said free rotational movement whereby said lock is controlled by said movement.

19. In speed power transmission apparatus, the combination comprising a driving shaft, a driven shaft, a direct coupling between said members having a degree of rotative free play with said driven member, wedging means to lock said driven member positioned at the end of said coupling whereby the diameter and the consequent rotative energy of said coupling is minimized to reduce shock incident to the operation of control mechanism therewith, and control means for said locking means operated by said coupling during the said free play movement to effect the release of the said lock for rotation of said driven shaft.

RUDOLPH PAYSON.